US007734443B2

(12) United States Patent
De et al.

(10) Patent No.: US 7,734,443 B2
(45) Date of Patent: Jun. 8, 2010

(54) SYSTEM AND METHOD FOR PREDICTION OF GAS TURBINE TRIPS DUE TO THERMOCOUPLE FAILURES

(75) Inventors: Soumen De, West Bengal (IN); Ravi Yoganatha Babu, Bangalore (IN); Viany Bhaskar Jammu, Bangalore (IN); Achalesh Kumar Pandey, Bangalore (IN); Richard John Rucigay, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 357 days.

(21) Appl. No.: 11/843,939

(22) Filed: Aug. 23, 2007

(65) Prior Publication Data

US 2009/0055070 A1    Feb. 26, 2009

(51) Int. Cl.
*G01K 1/08* (2006.01)
(52) U.S. Cl. ................. 702/132; 700/287; 236/15 BB; 60/39.091
(58) Field of Classification Search ................. 701/132, 701/130, 131; 700/287; 236/15 BB; 60/39.091; 702/130, 132, 131
See application file for complete search history.

(56) References Cited

U.S. PATENT DOCUMENTS

| 4,258,545 | A  | * | 3/1981  | Slater .................. 60/226.1 |
| 4,283,634 | A  | * | 8/1981  | Yannone et al. ........... 290/40 R |
| 6,363,330 | B1 | * | 3/2002  | Alag et al. ................ 702/132 |
| 6,941,217 | B1 | * | 9/2005  | Munson, Jr. ............... 701/100 |
| 7,140,186 | B2 | * | 11/2006 | Venkateswaran et al. ...... 60/772 |
| 7,461,510 | B1 | * | 12/2008 | Munson, Jr. ................ 60/796 |

* cited by examiner

*Primary Examiner*—Mark Hellner
(74) *Attorney, Agent, or Firm*—Ann M. Agosti (57) ABSTRACT

Systems and methods for prediction of gas turbine trips due to component failures such as thermocouple failures. Exemplary embodiments include prediction of gas turbine trips due to component failures, including collecting raw gas turbine operational data and using the raw gas turbine operational data to generate a prognostic indicator for the prediction of a turbine trip due to the failed thermocouples.

4 Claims, 6 Drawing Sheets

- Average: 50 min
- Minimum: 4 min
- Maximum: 133 min

SYSTEM AND METHOD FOR PREDICTION OF GAS TURBINE TRIPS DUE TO THERMOCOUPLE FAILURES

BACKGROUND

The present disclosure generally relates to systems and methods for prediction of gas turbine trips due to component failures such as thermocouple failures.

Gas Turbines are the main power producing components for combined cycle/independent power plants. A mixture of air and fuel is burnt in the combustor to produce thermal/heat that is converted into mechanical energy in the several stages of the turbine. Since the firing temperature of the combustor is very high (in the range of 1300-2200° F. (704-1204° C.)), the state of the combustor is measured by mounting thermocouples (TC) in the turbine exhaust. A dedicated controller assesses the state of the combustion process from these thermocouples and further determines if there are any abnormal operations in the combustor. If there is any abnormal event, it warrants immediate shut down of the combustor, hence the gas turbine. For example, exhaust TC failures can cause the controller to provide an incorrect indication of an abnormality in the combustion process. Under this situation, the controller cannot determine whether there is a real combustion event or not, and initiates a gas turbine trip, that is, a rapid uncontrolled shutdown of the gas turbine that is initiated by the turbine controller to protect the turbine from failures. In general, there can be several failure modes for a thermocouple such as grain growth in junction, insulation degradation, loose connections, shorting of lead wires, grounding of thermocouple wire, melted thermocouple junction, etc. Operators typically cannot predict trips due to TC failure.

Unwarranted trips, as mentioned above, can cause revenue loss and also have the adverse effect of reducing life of turbine components. Hence, there is a need for predicting an impending trip reliably and preventing loss of useful life of a gas turbine.

SUMMARY

Disclosed herein is a method for the prediction of gas turbine trips due to thermocouple failures, the method including collecting raw gas turbine operational data and using the raw gas turbine operational data to generate a prognostic indicator for the prediction of a turbine trip due to the failed thermocouples.

Further disclosed herein is a system for the prediction of gas turbine trips due to thermocouple failures, the system including a turbine, a local computer coupled to the turbine for collecting raw turbine operational data related to a thermocouple failure from the turbine, a remote computer coupled to the local computer, a process, residing on the local computer, for computing a prediction of trips, the process including instructions to generate a prognostic indicator for the prediction of a turbine trip due to the failed thermocouples and a database coupled to the remote computer for storing information related to a trip of the turbine.

Further disclosed herein is a method in a power plant having a turbine having components, for the prediction of gas turbine trips due to thermocouple failures, the method including generating thermocouple failure data having failure signatures from the turbine for collection in a remote computer, processing the thermocouple failure data to extract features based on the failure signatures and based on domain knowledge of the turbine, applying a rule set on the extracted features based on apriori probability and the domain knowledge and determining a fused belief of failure calculated from the rule set applied to the extracted features.

BRIEF DESCRIPTION OF THE DRAWINGS

The disclosure and embodiments thereof will become apparent from the following description and the appended drawings, in which the like elements are numbered alike.

DETAILED DESCRIPTION

The present disclosure provides detection of thermocouple failures in their incipient phase, identification of the root causes of the failure (diagnosis), and prediction of impending gas turbine trips. As further discussed below, the present disclosure further provides detection, identification and prediction for other types of failures and causes of trips including but not limited to: GCV not following command signals; high exhaust pressures, etc. Unwarranted trips that cause revenue loss and loss of useful life can therefore be reduced or eliminated. Real time diagnostics, prognostics and a case logging platform that prognoses and provides suitable recommendations for impending trips in gas turbines arising from failed thermocouples is provided. In exemplary implementations, the systems and methods proactively detect a TC failure, extract several signatures from the gas turbine, and then fuse these features to determine the time to trip.

Figure 1:
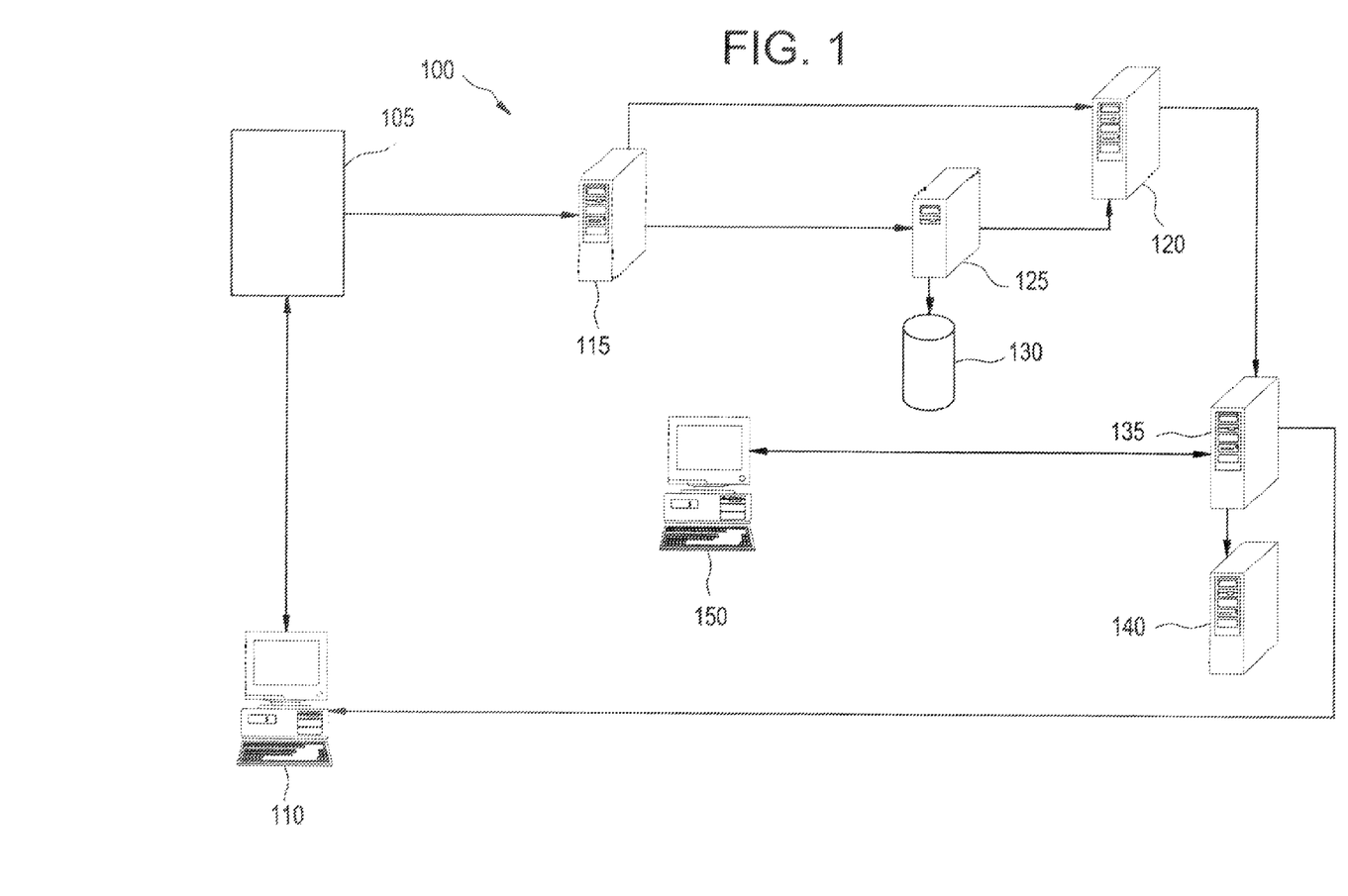
FIG. 1 illustrates an exemplary embodiment of a trip prediction system.

FIG. 1 illustrates an exemplary embodiment of a trip prediction system 100. In general, system 100 analyzes and prepares data that predict turbine trips and recommends time-to-trip in advance and suggests suitable recommendations, so that the trip can be avoided or graceful shutdown can be taken. System 100 includes turbine 105 that is coupled to a technician computer 110. Turbine 105 is further coupled to a local computer 115 into which gas turbine operational data are collected in real time and fed to developed algorithms, which are running on local computer 115. Local computer 115 reads failure signatures from the failed components, the gas turbine parameters and calculated features that are indicative of failure events. Local computer 115 is further coupled to a remote computer 120 to which relevant fault data is transmitted. Remote computer 120 uses expert rules and interacts with a case base reasoning (CBR) system 125 that provides suitable case data to reinforce the prediction from the rule engine and provides diagnostic recommendations. Remote computer 120 is further coupled to a clarification server 135, which is coupled to a failure reporting computer 140, the computers in combination providing clarifications of failures, trip reduction analyses and service recommendations to a service computer 150. In general, remote computer 120 and clarification server 135 can provide messages to concerned personnel such as an operator of technician computer 110 indicating recommended action based on the processed turbine data that has been analyzed and a time-to-trip that has been calculated. Whenever the algorithms capture an incipient failure (of a sensor or a system), it raises a time to trip indicator, which is sent to a remote case logging and reporting system to provide suitable trip mitigation recommendations. In this way, appropriate action can be taken, such as but not limited to, a graceful shutdown, and repairing the identified problem before a trip is initiated. A services database 130, which contains the record of the trip cases and the follow-up corrective actions for maintaining a history and audit trail, can be maintained. Whenever system 100 raises an indication of an impending trip condition, a case is registered or updated (depending upon when was the last case opened) in the service database with the diagnostics and recommendations (from the rule based engine), which can be used by the site personnel or people responsible for taking suitable recommended actions.

Figure 2:
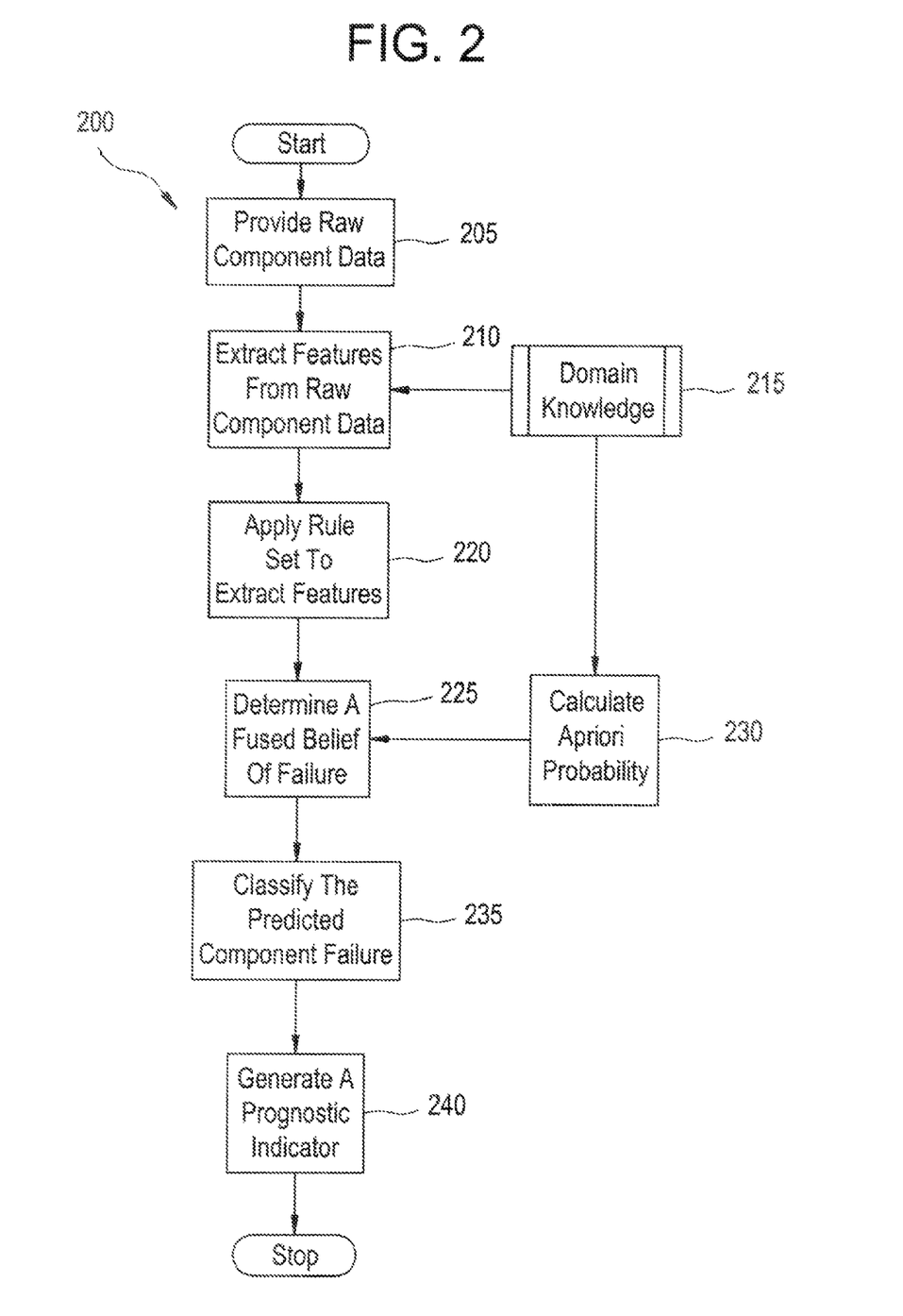
FIG. 2 illustrates an exemplary method for trip prediction due component failure.

FIG. 2 illustrates an exemplary method 200 for trip prediction due component failure. At step 205, raw component data, which can be indicative of component failure is collected in the local computer 115 from the turbine 105. At step 210, features are extracted from the raw data and collected in the local computer 115, based on domain knowledge provided at step 215. Physics-based methods, such as but not limited to: gas turbine swirl angle relationship, thermo-couple junction and circuit model, cycle deck models of the gas turbine etc., are used to identify the features whenever there is an incipient failure. Statistics-based methods, such as Bayesian Fusion, Neamen Pearson Method, Demster Schaffer method, etc., are used to fuse those features leading to one trip prediction indicator, which can be tracked over time. The progression of these indicators as they cross thresholds (which comes from domain knowledge and experience) is used to raise flags or time to trip indications. The failure signatures from the failed components are understood in the context of the gas turbine controller algorithms and used to compute features that provide significant progression with impending trips. At step 220, a rule set is applied to the extracted features, which in general, occurs at remote computer 120. At step 225, a fused belief of failure is determined. In this context, a belief of failure of failure is a conditional probability of failure based on domain knowledge of the turbine 105 as well probability that has been calculated beforehand, as is now further discussed. Domain knowledge at step 215 as well as a calculated apriori probability at step 230 are used in determining the fused belief of failure at step 225. The fused belief is a probability based on a combination of the domain knowledge and apriori probability. In one exemplary implementation, as discussed further in the examples below, a formula yielding this conditional probability is derived from Bayesian statistics using Bayes theorem as follows:

$$P(T/E_i) = \frac{P(T) \prod_{i=1 \ldots n} P(E_i/T)}{P(T) \prod_{i=1 \ldots n} P(E_i/T) + P(-T) \prod_{i=1 \ldots n} P(E_i/-T)}$$

that is described further in the examples below.

At step 235, the predicted component failure is classified. At step 240, a prognostic indicator is generated. As discussed above, whenever system 100 raises an indication of an impending trip condition, a case is registered or updated (depending upon when was the last case opened) in the service database 130 with the diagnostics and recommendations (from the rule-based engine) which can be used by the site personnel responsible for taking suitable recommended actions.

Figure 3A:
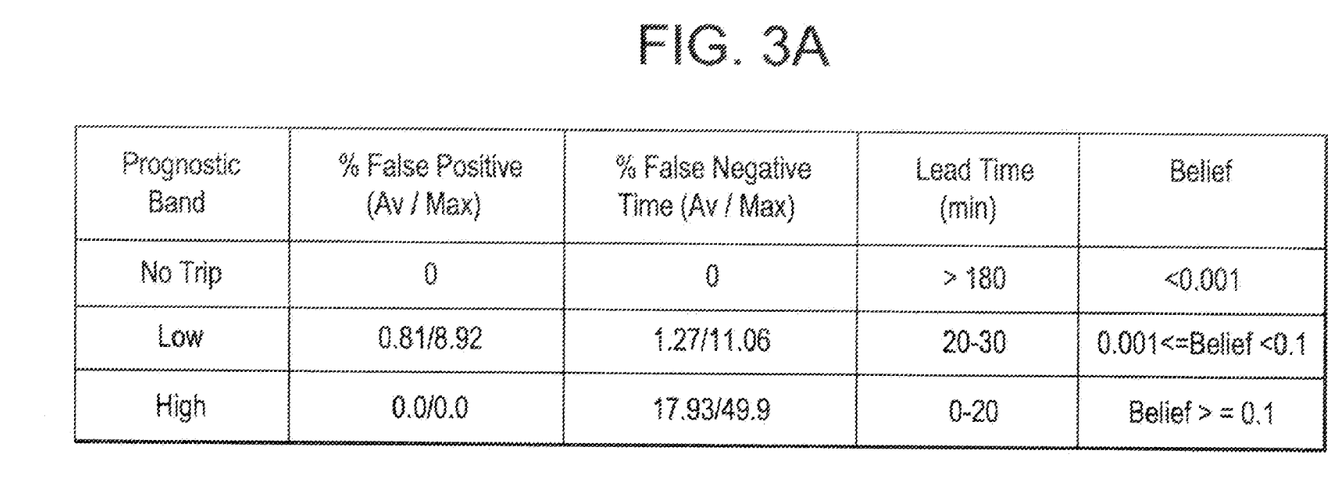
FIG. 3A illustrates a table that associates prognostic bands with belief thresholds and lead-time ranges, as well as false positive and negative thresholds.

Furthermore, data is provided on a predicted time in which action should be taken before an unwanted trip occurs. FIG. 3A illustrates a table that associates prognostic bands with belief thresholds and lead-time ranges, as well as false positive and negative thresholds. In general, belief thresholds can be identified and associated with prognostic bands, which in turn can define lead times in which a user can act. In addition, a prediction is considered a false positive if the methods fail to correctly predict a trip if the prediction is more than some specified time period earlier that the actual time to trip. This time period is considered to be excessive lead time. Furthermore, a prediction is considered a false negative if the method fails to correctly predict a trip more than some specified time period later than the actual time to trip.

Figure 3B:
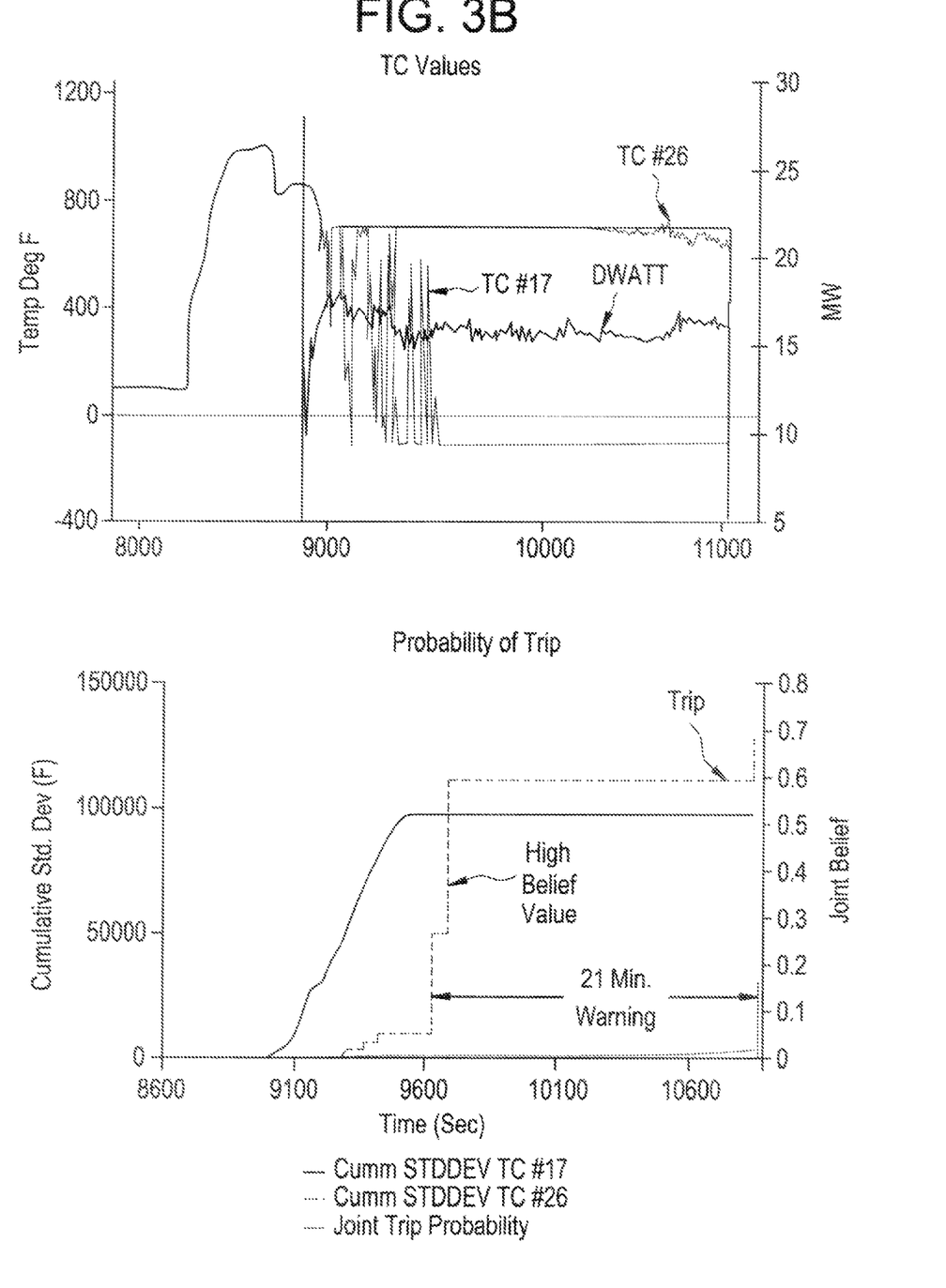
FIG. 3B illustrates an exemplary prediction of trips due to failed thermocouples.

FIG. 3B illustrates an exemplary prediction of trips due to failed thermocouples. The top graph shows TC#17 failing around 9000 seconds and TC#26 failure around 10500 seconds. The combined failure of two thermocouples caused significant variation is the thermocouple spread that lead to the trip of the turbine at 10900 seconds. The bottom graph is showing the results of the algorithms described in the document along with one of the indicator cumulative standard deviation of TC#17 and TC#18. As the feature values increases the trip probability increases to value of 0.6 about 21 minutes before the actual trip occurred.

Figure 3C:
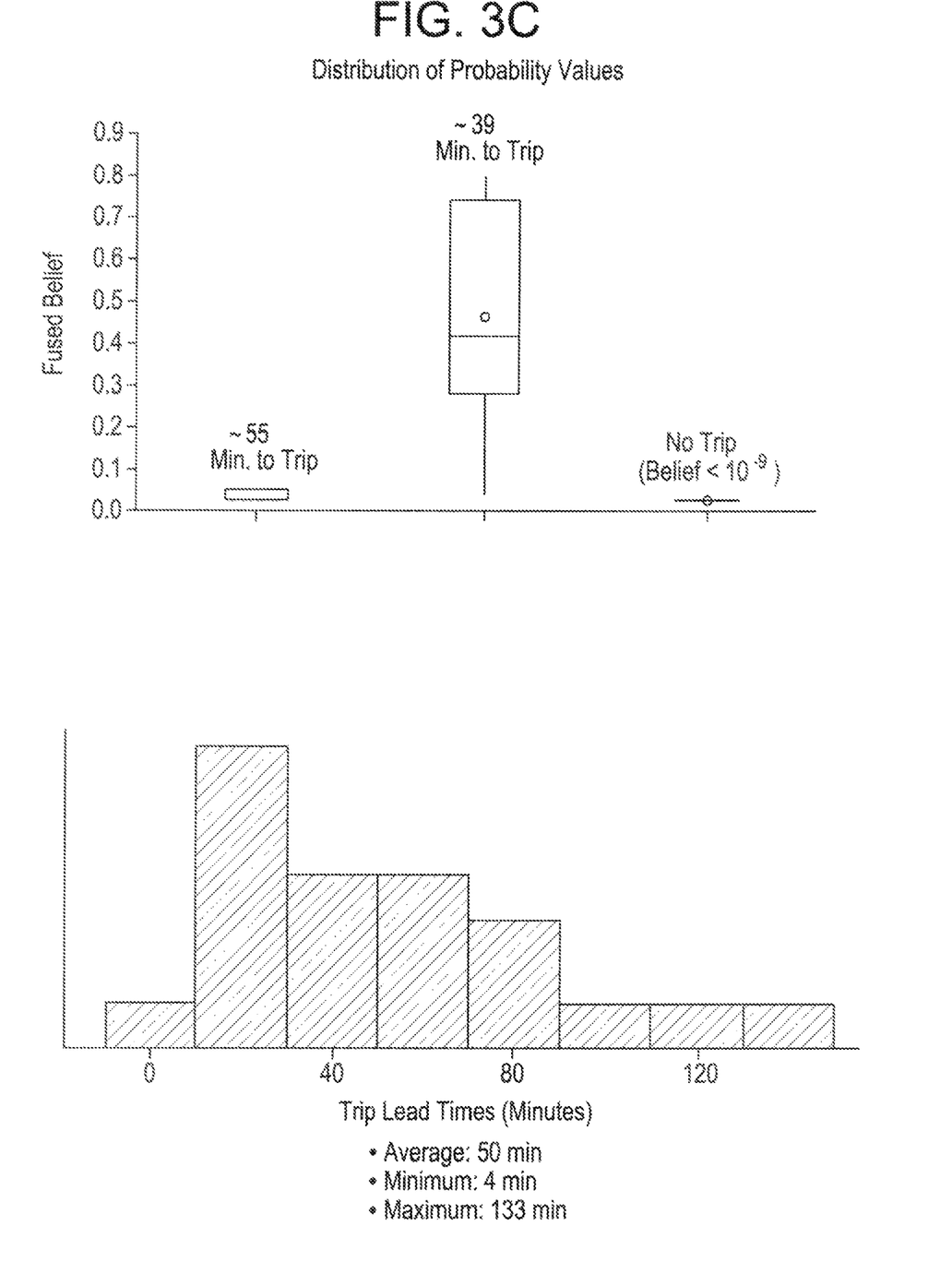
FIG. 3C illustrates exemplary summary results of trips due to thermocouple failures.

FIG. 3C illustrates exemplary summary results of trips due to thermocouple failures. The distribution of probability values with respect to time to trip is shown in the top graph. When there is no trip, the belief value is small (<10-9). However, when the trip value is around, 0.1, this is indicative of roughly 55 minutes of warning time for an impending trip. The bottom graph gives the distribution of the lead time in minutes for various cases tested. As it can be seen, around 80% of the trip, the algorithm was able to provide more than 15 minutes warning time.

Figure 4:
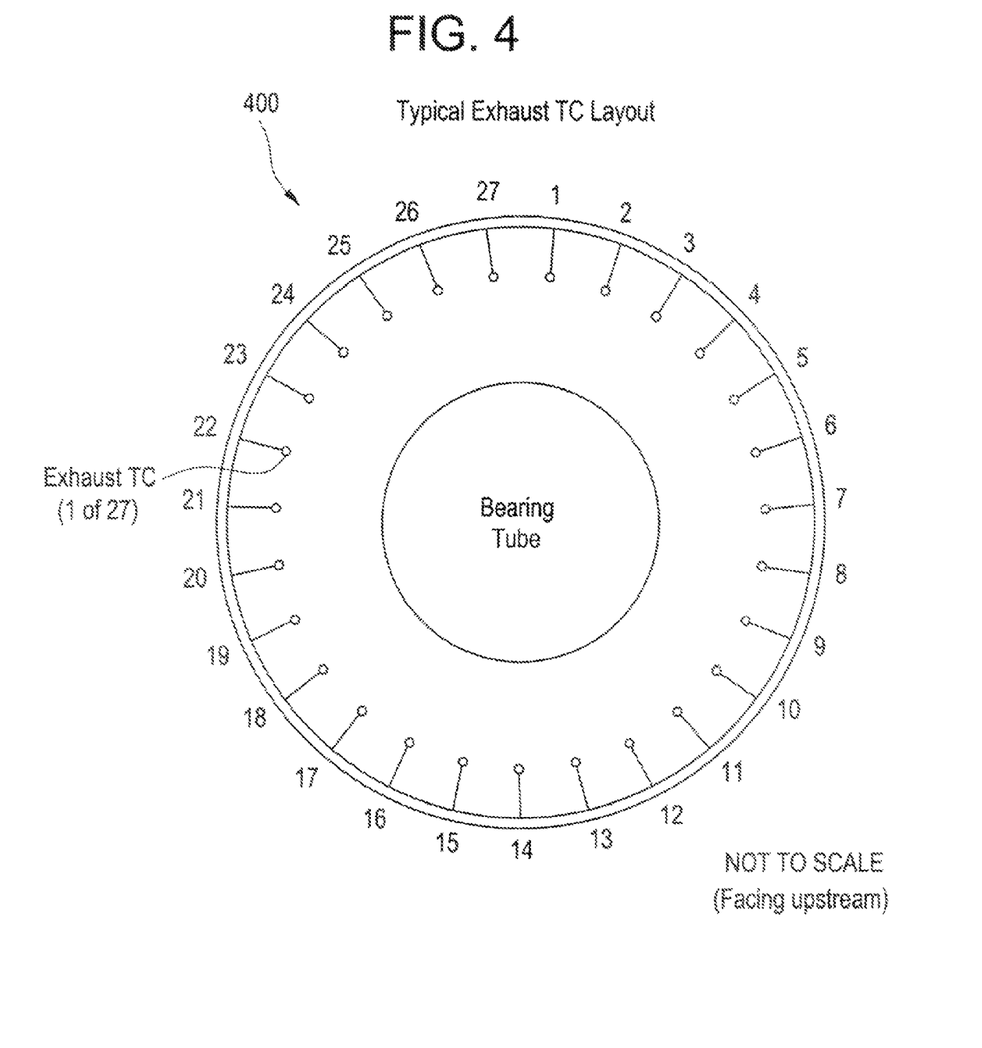
FIG. 4 illustrates an exhaust thermocouple configuration for a gas turbine for which exemplary embodiments of the systems and methods can be applied for trip prediction.

As discussed above, the systems and methods described herein can be applied to predict trips due to thermocouple failures. FIG. 4 illustrates an exhaust thermocouple configuration 400 for a gas turbine for which exemplary embodiments of the systems and methods can be applied for trip prediction. As discussed, the systems and methods described herein can be applied to combustion monitor algorithms for detecting real events as collected by local computer 115. In this example, trips from a failed exhaust thermocouple can be explained. Exhaust temperature is measured by an array of up to 36 type-K thermocouples that are placed directly in the turbine exhaust gas stream, downstream of the last stage buckets. It is appreciated that the number and specific orientation of TCs varies between turbine frame sizes.

Since the turbine combustor temperature is very high and difficult to measure, the controller, which can be a programmable logic controller (PLC), assesses the conditions of the combustor using exhaust thermocouples (and also compressor pressure ratio or compressor discharge pressure). The combustion monitor module of the controller monitors the combustors health using the above thermocouple information and initiates a trip (this trip is a desired trip) when machine protection is desired.

The combustion monitor system generates the exhaust temperature highest spread, second highest spread and third highest spread, and also determines if the two highest spreads are adjacent to each other. Spread is the measure of the non-uniformity of the energy content of the exhaust flow mainly because of 1) uneven distribution of fuel within the combustor can, 2) uneven distribution of air within the combustor can, and 3) random difference in the can (can-can variation) such that the exit temperatures are not equal. As explained, usually three spread calculations are done. Spread 1 is given by TTXSP1—(the difference between the hottest and coldest exhaust thermocouples). Spread 2 is given by TTXSP2—(the difference between the hottest and second coldest exhaust thermocouples). Spread 3 is given by TTXSP3—(the difference between the hottest and third coldest exhaust thermocouples). It is appreciated that these spreads represent raw component data collected by local computer 115 from turbine 105. It is further appreciated that other raw component data can include but is not limited to: exhaust temperatures thermocouple (TTXD_N), where N=1-27; allowable spread (TTXSPL); fuel stroke reference (FSR); turbine exhaust median temperature (TTXM); compressor discharge temperature (CTD); gas turbine MW (DWATT), etc.

Thermocouple failure algorithms for detecting TC failures can be developed and utilized. When the exhaust thermocouples have failed or are malfunctioning (incipient failed), some of the above spreads come up, and when they are combined (fused) with the TC failure signatures, they can be used to distinguish between a real event (e.g., combustor trouble) and a spurious event (e.g., malfunctioning exhaust TC)

There are many different failure modes of the thermocouples that are modeled using the physics-based model, of which signatures of failure can be communicated to local computer 115. Such failure modes include but are not limited to: TC tip/lead wire grounding insulation degradation; positive and negative lead wire shorting due to failed insulation, in which no provision is made for thermal growth TC stretch; poor quality; loose wiring; insertion problem (e.g., over insertion, exposure to radiation, etc.); cold junction affected by heat in panel; incorrect TC used; TC junction grain growth; diffusion of impurities at junction; hardware fault in the signal processing circuit, etc.

Data from good and bad thermocouples can include indicators that TC is failed or about to fail, including, but not limited to: a constant low value (e.g., −117° F. (−83° C.)), which can be due to an open junction; a constant high value (e.g., ~1130° F. (610° C.), mainly due to the manual forcing of the TC value; and erratic fluctuations, such as TC degradation, loose wiring, etc.

In an exemplary implementation, standard deviation (STD DEV) can be a good measure of the aforementioned failure modes, and therefore an extracted feature. For the first two mentioned failure mode 1 and 2, a zero standard deviation is given while for the third failure mode 3, a high standard deviation is given compared to neighboring good ones, measuring the same temperature. Given below are the steps used for formulating the failure detection algorithms:

Condition 1: Ymin <= Y(t) <= Ymax

Where Y(t) = present value of TC
Ymin: Minimum acceptable value of a good TC
Ymax: Maximum acceptable value of a good TC
Condition 2: STD_TC < gamma + bias && STD_TC <> 0

STD = Standard Deviation (Rolling buffer of X minutes, where X can be configured based on operation condition)
gamma: is the fixed value
bias is a value that depends of the turbine operational condition, e.g. during the transient operation the bias can be increased by up to 500° F. (260° C.) for a start up or shut down. Also, considering the failure mode where failed TC values sticks to a particular value where as others show a small statistical variation the STD_DEV check of not being equal to zero, is imposed -continued Condition 3: ABS { STD_TC − AVG(STD_ALL_TC) } < delta Where AVG(STD_ALL_TC) excludes the current TC and those TC which fails condition 1 and condition 2.
delta: A value which is a function of normal process noise at steady state The failure mechanism for a real event and a failed thermocouple are used to extract features in real time. The local computer 115 reads the gas turbine data in real time and computes all these features as given below.

The E1, Max standard deviation feature is calculated on the basis that a incipient failure in a TC manifests itself in fluctuations, making its standard deviation higher than others, where E1 (Maximum cumulative standard deviation of failed TC) is given by, $CUM\_SD = \int (SD - SD_{REF}) * \delta t$, where the integral is taken from 0−t, where $t > t_{incipient}$.

The E2, Cumulative value of combustion alarm is calculated on the basis that whenever a TC fails the maximum spread value (which the difference between the hottest and coldest thermocouples) and exceeds the maximum allowable spread value computed by the controller, where E2 (Cumulative value of combustion alarm) is given by, Combustion Alarm=TTXSP1>TTXSPL.

The E3, Cumulative value of TC trouble alarm is calculated on the basis that whenever a TC fails the maximum spread value (which the difference between the hottest and coldest) and exceeds 5 times the corrected allowable spread value computed by the controller, where E3 (Cumulative value of TC trouble alarm) is given by, TC Trouble Alarm=TTXSP1>5*TTXSPL_z.

The E4: Cumulative value of spread 2 exceedance is calculated on the basis that whenever a TC fails the second maximum spread value (which the difference between the hottest and second coldest) and exceeds 0.8 times the maximum allowable spread computed by the controller, where E4 (Cumulative value of spread2 exceedance) is given by, Spread2 Exceedance=TTXSP2>0.8*TTXSPL.

It is appreciated that other features are considered in other examples, including, but not limited to: adjacency (cold1 and cold2, in which the coldest TC is adjacent to the second coldest TC), and adjacency (cold2 and cold3, in which the second coldest TC is adjacent to the third coldest TC, cold and hot spots, etc.).

Each of these features provides indications that one or more thermocouples are malfunctioning. Since one feature alone does not give high confidence of impending trips, these features are fused with a Bayesian belief fusion technique. As discussed above, the formula yielding this probability is:

$$P(T/E_i) = \frac{P(T) \prod_{i=1\ldots n} P(E_i/T)}{P(T) \prod_{i=1\ldots n} P(E_i/T) + P(-T) \prod_{i=1\ldots n} P(E_i/-T)}$$

The conditional probability for obtaining features (Ei) for a trip event is given by P(Ei/T). The conditional probability for obtaining features (Ei) for a non-trip event is given by P(Ei/−T). Apriori belief value for a trip is P(T), and apriori belief value for no trip is P(−T). Applying the aforementioned features to the Bayesian belief fusion formula yields:

$P(T/E1,E2,E3,E4) = N/(D1+D2)$

Where $N = P(T) * \{P(E1/T) * P(E2/T) * P(E3/T) * P(E4/T)\}$, $$D1 = [P(T)*\{P(E1/T)*P(E2/T)*P(E3/T)*P(E4/T)\}],$$
and
$$D2 = [P(-T)*\{P(E1/-T)*P(E2/-T)*P(E3/-T)*P(E4/-T)\}]$$

The fused Bayesian belief value is calculated from the above formula. A failed TC doesn't necessarily cause the trip, though the trip depends upon thermocouple failure modes and turbine operation. The features arising from a failed TC has to meet conditions of the gas turbine controller trip logic to initiate a trip. Features, as described above, are extracted not only from a failed TC or a TC that is about to fail, but also on signatures and other indications as described above. These extracted features are fused based upon different TC failure modes. Various rules are used to decide this fusion. Based upon the rules, some features are included or excluded from joint belief calculation. In addition, some features are allocated different weights compared to others, thereby placing greater concern on some of the features than others. For example, when one exhaust TC is already in failed condition (negative value) and a second exhaust TC also fails or starts failing, the cumulative value of spread2 exceedence (E4) feature is also included with the other three features in joint belief value calculation. At this time, the other three features are given a higher weighting in comparison to previous conditions.

Finally, using the above fusion and rules set, a final unified belief value is calculated and tracked over time. Whenever the fused value exceeds threshold bands, corresponding prognostic indicators are generated by the local computer 115. The data is then transmitted by the communication link to the remote computer 120, which initiates the rule engine and the CBR engine 125. Based on the algorithms recommendation, a case is opened in the service database 130. Also, based on the recommendation from the CBR system 125 and the rule engine residing on the remote computer 120, it writes suitable diagnostics and trip mitigation recommendations in the service database 130. The persons concerned, such as a technician at technician computer 110, uses these results to do further analysis (if required) and carry out the recommendations. Furthermore, data is provided on a predicted time in which action should be taken before an unwanted trip occurs. As such several alarms can be triggered, including, but not limited to: a sluggish response alarm, a forced TC value alarm, a time to trip alarm, etc.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for the prediction of gas turbine trips due to thermocouple failures, the system comprising:
  a turbine;
  a local computer coupled to the turbine for collecting raw turbine operational data indicative of any thermocouple failures from the turbine;
  a process, residing on the local computer, for computing a prediction of turbine trips by extractincg features indicative of any thermocouple failure from the raw turbine operational data, the process including instructions to generate a prognostic indicator for the prediction of any turbine trip;
  a remote computer coupled to the local computer configured to:
    perform a trip reduction analysis by applying a rule set to the extracted features;
    generate recommendations to prevent the turbine trips based upon the trip reduction analysis; and
  a database coupled to the remote computer for storing information related to any trips of the turbine.

2. The system as claimed in claim 1, wherein the database comprises a computer readable medium having a plurality of data nodes stored on the medium and representing a data structure, comprising:
  a first data node stored in a first region of a range of memory addresses in the medium, the first data node representing a time to trip indicator;
  a second data node stored in a second region of a range of memory addresses in the medium, the second data node representing trip mitigation recommendations; and
  an index stored in an index region of the range of memory addresses, the index storing relationship information between the first and second data nodes, wherein the second process includes instructions to generate appropriate action to mitigate the trip.

3. The system as claimed in claim 2, wherein the appropriate action to mitigate the trip is at least one of a graceful shutdown of the turbine and a repair of the failed thermocouple.

4. The method as claimed in claim 1, wherein thermocouple features indicative of a turbine trip include at least one of a maximum standard deviation based on thermocouple fluctuations, a cumulative value of combustion in excess of a maximum threshold, a cumulative value of a thermocouple trouble alarm, and a cumulative value of a spread2 exceedance.

* * * * *

UNITED STATES PATENT AND TRADEMARK OFFICE
CERTIFICATE OF CORRECTION

PATENT NO. : 7,734,443 B2
APPLICATION NO. : 11/843939
DATED : June 8, 2010
INVENTOR(S) : De et al.

It is certified that error appears in the above-identified patent and that said Letters Patent is hereby corrected as shown below:

On the Title Page, in Item (75), under "Inventors", in Column 1, Line 3,
delete "Viany Bhaskar Jammu" and insert -- Vinay Bhaskar Jammu --, therefor.

In Column 8, Line 23, in Claim 1, delete "extractincg" and insert -- extracting --, therefor.

Signed and Sealed this

Third Day of August, 2010

David J. Kappos
*Director of the United States Patent and Trademark Office*